US008078903B1

(12) United States Patent
Parthasarathy et al.

(10) Patent No.: US 8,078,903 B1
(45) Date of Patent: Dec. 13, 2011

(54) AUTOMATIC LOAD-BALANCING AND SEAMLESS FAILOVER OF DATA FLOWS IN STORAGE MEDIA ENCRYPTION (SME)

(75) Inventors: Anand Parthasarathy, Fremont, CA (US); Manali Chandrakant Holankar, San Diego, CA (US); Kalyan Chakravarthy Nidumolu, San Jose, CA (US); Chandra Sekhar Kondamuri, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 252 days.

(21) Appl. No.: 12/323,236

(22) Filed: Nov. 25, 2008

(51) Int. Cl.
    G06F 11/00 (2006.01)
(52) U.S. Cl. ............ 714/4.11; 714/43; 380/278
(58) Field of Classification Search .......... 714/4, 43, 714/10–12, 4.1; 380/278
    See application file for complete search history.

(56) References Cited

U.S. PATENT DOCUMENTS

| 7,421,578 | B1 * | 9/2008 | Huang et al. ............ 713/163 |
| 2006/0080323 | A1 * | 4/2006 | Wong et al. ............ 707/10 |
| 2008/0065889 | A1 * | 3/2008 | Greco et al. ............ 713/171 |
| 2009/0037763 | A1 * | 2/2009 | Adhya et al. ............ 714/4 |
| 2009/0092252 | A1 * | 4/2009 | Noll et al. ............ 380/277 |
| 2009/0287500 | A1 * | 11/2009 | Benjamin et al. ............ 705/2 |

OTHER PUBLICATIONS

Cisco MDS 9000 Storage Media Encryption (SME Software), http://www.compaq.com/storage/networking/c_switches/mds9000_specs.html printed Nov. 21, 2008.
Storage Media Encryption and Enterprise Key Management, RSA Technology Solution Brief printed Nov. 21, 2008, 16 pages.
US Access: Neoscale CryptoStor FC, CryptoStor for Tape and CryptoStor SAN VPN, http://www.usaccess-llc/com/ neoscale_html?gclid=CLibxoX_hpcCFRIcawodlmhS-A printed Nov. 21, 2008, 4 pages.
Decru—company profile on STORAGEsearch.com, printed Nov. 21, 2008, 2 pages.

* cited by examiner

*Primary Examiner* — Yolanda L Wilson
(74) *Attorney, Agent, or Firm* — Weaver Austin Villeneuve & Sampson LLP (57) ABSTRACT

Methods and apparatus for encrypting data are disclosed. In accordance with one embodiment, data path information identifying a data path is provided to one or more of a plurality of nodes in a cluster of nodes in a network, each of the nodes in the cluster being configured for encryption of data. One of the nodes is selected to be responsible for encryption of data in the data path. The selected one of the nodes is notified of its responsibility for encryption of data associated with the data path, wherein traffic associated with the data path is redirected to the selected one of the nodes.

24 Claims, 9 Drawing Sheets

FIG. 7

AUTOMATIC LOAD-BALANCING AND SEAMLESS FAILOVER OF DATA FLOWS IN STORAGE MEDIA ENCRYPTION (SME)

BACKGROUND

1. Technical Field

The present disclosure relates generally to methods and apparatus for performing encryption of data in a network.

2. Description of the Related Art

In a network such as a Fibre Channel network, a host may write data to a target. In order to store the data in a secure fashion, the data is often encrypted by the host prior to writing the data to the target. In other systems, the data may be encrypted by the target prior to storing the data. Some systems require that an additional device be placed in the path between the host and the target so that the device can encrypt the data. Unfortunately, if the device fails, the device must be manually replaced with another device.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well-known process steps have not been described in detail in order not to unnecessarily obscure the disclosed embodiments.

Overview

In one embodiment, data path information identifying a data path is provided to one or more of a plurality of nodes in a cluster of nodes in a network, each of the nodes in the cluster being configured for encryption of data. One of the nodes is selected to be responsible for encryption of data in the data path. The selected one of the nodes is notified of its responsibility for encryption of data associated with the data path, wherein traffic associated with the data path is redirected to the selected one of the nodes.

Specific Example Embodiments

The disclosed embodiments enable data to be encrypted prior to being stored at a target. This is accomplished by distributing the responsibility for encryption among various nodes in the network. Upon failure of one of these nodes, the failed node may be automatically and seamlessly replaced with another node.

In accordance with various embodiments, a cluster of nodes in a network includes two or more nodes which each may be configured with the capability to encrypt data. Similarly, the two or more nodes may each be configured with the capability to decrypt data. For instance, each node in the cluster of nodes may be configured with information and/or software supporting encryption and/or decryption.

Responsibility for encryption and/or decryption of data may be distributed among a cluster of nodes in the network. For instance, responsibility for encryption and/or decryption of data associated with various "data paths" may be distributed to various nodes in the cluster. A data path (i.e., data flow) may be identified by a host identifier (e.g., IP address) identifying a host, a target identifier (e.g., IP address) identifying a target, and/or logical unit (LUN) within the target.

When data is being stored to a target, the data path may be specified by a host identifier identifying a source of data being transmitted, a target identifier identifying a destination (e.g., target) to which the data is to be written (after encryption), and/or LUN within the target in which the encrypted data is being stored. In these instances, a responsible node may encrypt the data prior to forwarding it to the target and/or LUN. Similarly, when data is being retrieved from the target, the data path may be specified by a target identifier identifying a target (source) from which encrypted data is being retrieved, a host identifier identifying a host (destination) retrieving the data, and/or LUN within the target from which the encrypted data is being retrieved. In these instances, a responsible node may decrypt the data prior to forwarding it to the host.

Responsibility for encryption and/or decryption may be assigned to various nodes in the cluster by a separate node. This separate node may be referred to as a "master node." The cluster of nodes may include a set of one or more nodes which may each be referred to as a "non-master node" (i.e., node or cluster node). The master node may be a node in the cluster of nodes, but need not be a node in the cluster of nodes.

For purposes of the following description, a node in the cluster of nodes is a separate entity that is capable of performing encryption and/or decryption. In some embodiments, a node in the cluster of nodes may be a network device such as a switch or router. Such a node may be identified by an identifier such as an IP address. In other embodiments, a node in the cluster of nodes may be a line card in a network device such as a switch or router that includes one or more line cards. Thus, a network device such as a switch may include one or more nodes. For a network device that includes multiple line cards, one or more of the line cards may each be a node in the cluster of nodes. Where a node is implemented in a particular line card, the node may be identified by a network device identifier (e.g., IP address), as well as a line card identifier (e.g., slot number).

Figure 1:
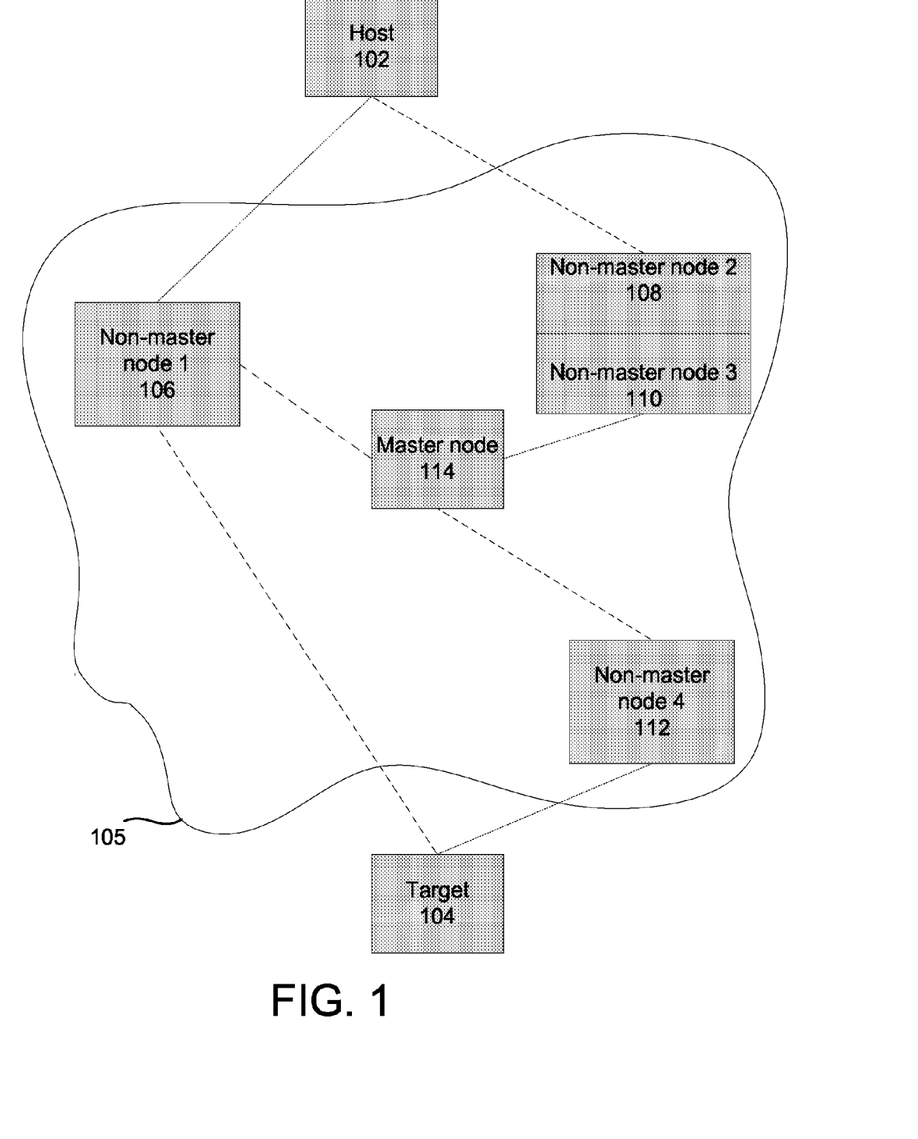
FIG. 1 is a block diagram illustrating an example network in which various embodiments of the invention may be implemented.

FIG. 1 is a block diagram illustrating an example network in which various embodiments of the invention may be implemented. As shown, a host 102 may transmit data to be stored at a target 104, as well as retrieve data from the target 104. The host 102 and the target 104 may communicate via a network 105. Encryption of data transmitted by hosts in the network 105 and decryption of data retrieved by these hosts in the network 105 may be performed by a cluster of nodes. Specifically, each of the cluster of nodes may be configured to perform encryption of data and/or decryption of data.

The cluster of nodes may include any number of nodes, which may include "non-master nodes." The cluster may also include one or more "master nodes." As shown in this example, the cluster includes four separate nodes. Specifically, the cluster includes a first non-master node (Non-master node 1) 106, a second non-master node (Non-master node 2) 108, a third non-master node (Non-master node 3) 110, and a fourth non-master node (Non-master node 4) 112. The first non-master node 106 and the fourth non-master node 114 are each implemented as separate network devices. For instance, each of these network devices may be a switch or router. The second non-master node 108 and the third non-master node 110 are shown in this example to be implemented in the same network device. For example, the second non-master node 108 and the third non-master node 110 may be implemented in separate line cards.

A data path may be a path via which data is transmitted. Specifically, a data path may be identified by a host identifier and a target identifier. The responsibility for encryption and/or decryption of data associated with a particular data path may be assigned to a particular node in the cluster. Such assignments may be performed by a master node 114.

In order to simplify the illustration, FIG. 1 is shown to include a single host and target. However, it is important to note that a network will typically include multiple hosts and targets. Thus, the disclosed embodiments may be implemented in a system including any number of hosts and targets.

Figure 2:
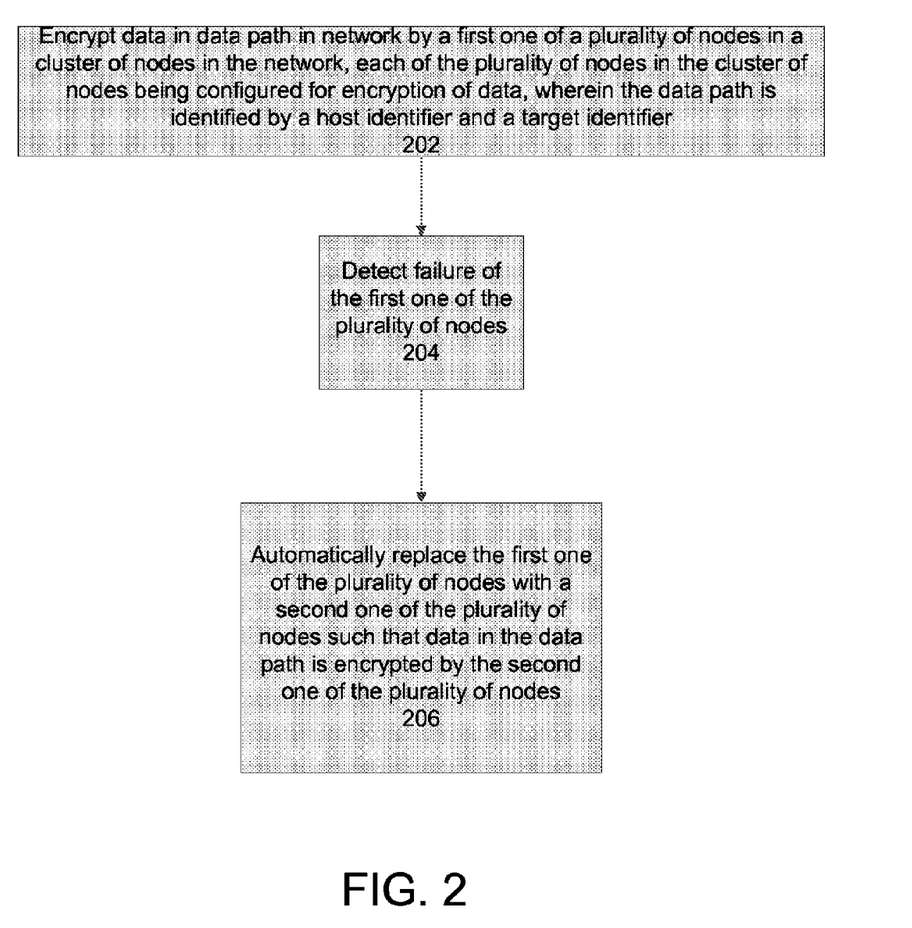
FIG. 2 is a process flow diagram illustrating an example method of encrypting data.

FIG. 2 is a process flow diagram illustrating an example method of encrypting data in accordance with one embodiment. A first one of a plurality of nodes in a cluster of nodes in a network may encrypt data in a data path in the network at 202. The data path may be identified by a host identifier and a target identifier. As set forth above, each node in the cluster of nodes may be configured to encrypt data. A failure of the first one of the plurality of nodes may be detected at 204. For instance, the failure may be detected by the first node or another node such as a master node that controls which node in the cluster is responsible for performing encryption and/or decryption of data in a data path. The first one of the plurality of nodes may be automatically replaced with a second one of the plurality of nodes such that data in the data path is encrypted by the second one of the plurality of nodes at 206. Selection of the second one of the plurality of nodes that is to replace the first one of the plurality of nodes may be performed by a master node, as will be described in further detail below.

While a plurality of nodes in a cluster may be configured with the capability to perform encryption and/or decryption, each of the plurality of nodes may have different responsibilities with respect to encryption/decryption within the network. Specifically, responsibilities may change over time, or in response to various failures within the network. Thus, at any given point in time, one or more nodes in the cluster may have no responsibility to encrypt or decrypt data, while other nodes may be given the responsibility to encrypt and/or decrypt data. Such responsibility may be specific to a given data path. For instance, one node may be responsible for encrypting and/or decrypting data associated with a first data path, while another node may be responsible for encrypting and/or decrypting data associated with a second data path. A data path may be identified by one or more identifiers, such as a host identifier, target identifier, and/or logical unit (LUN).

Figure 3A:
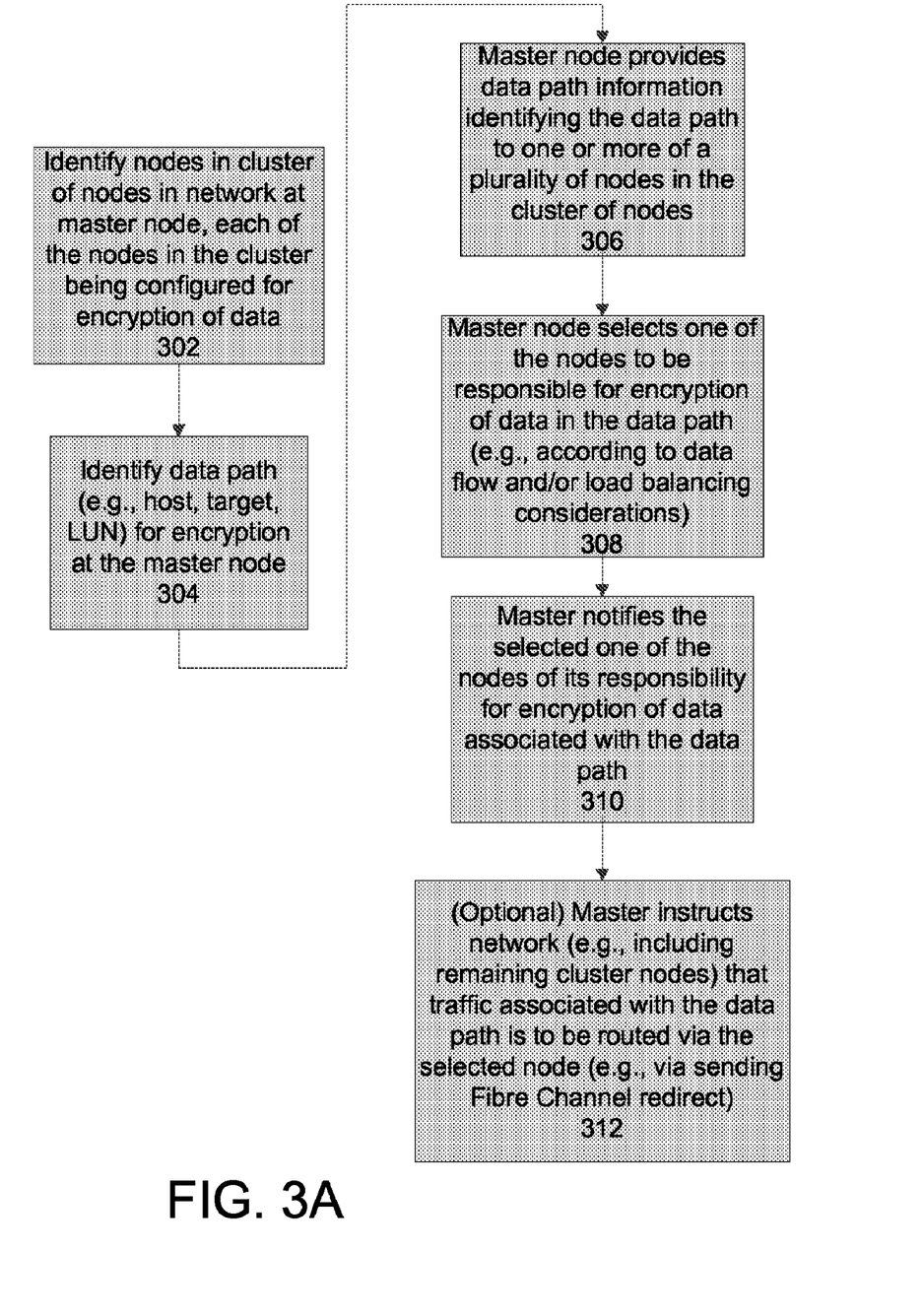
FIG. 3A is a process flow diagram illustrating an example method of configuring nodes in a cluster of nodes by a master node.

FIG. 3A is a process flow diagram illustrating an example method of configuring nodes in a cluster of nodes to be responsible for various data paths in accordance with one embodiment. A cluster may be statically or dynamically configured to include any combination of nodes in the network. For instance, each node in the cluster of nodes may be identified individually at a master node at 302. The master node may then notify various nodes in the cluster of their responsibilities to perform encryption and/or decryption for various data paths. Specifically, each node in the cluster may be responsible for encryption and/or decryption of zero or more data paths.

A data path to for which data is to be encrypted may also be identified at the master node at 304. Specifically, the data path may be identified by a host identifier (e.g., IP address), target identifier (e.g., IP address), and/or LUN identifier. The master node may provide data path information identifying the data path to one or more of a plurality of nodes (e.g., non-master nodes) in the cluster of nodes at 306. For instance, the data path information may include a host identifier, target identifier, and/or LUN identifier. The master node may select one of the nodes (e.g., non-master nodes) to be responsible for encryption and/or decryption of data in the data path at 308. For instance, the master node may consider data flow and/or load balancing considerations in the selection of a node. The master node may notify the selected one of the nodes of its responsibility for encryption of data associated with the data path at 310. The master node may instruct the network (e.g., other non-master nodes and network devices that are not in the cluster) that traffic associated with the data path is to be routed via the selected node at 312. For instance, the master node may send a Fibre Channel redirect that notifies devices in the network that traffic is to be redirected to the selected node. Alternatively, the selected node may send such a notification to ensure that traffic associated with the data path is redirected to it. Steps 304-312 may be repeated for multiple data paths to be encrypted.

Figure 3B:
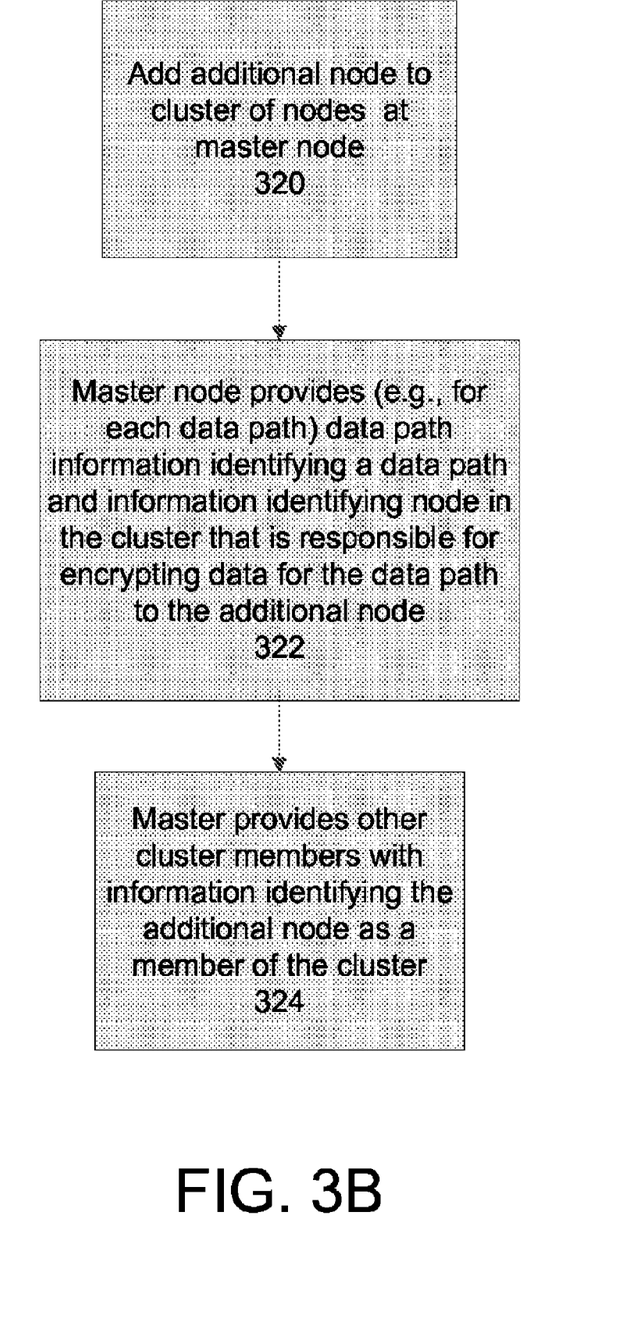
FIG. 3B is a process flow diagram illustrating an example method of adding a node to a cluster of nodes by a master node.

In accordance with various embodiments, a cluster of nodes may be modified or generated statically or dynamically. FIG. 3B is a process flow diagram illustrating an example method of adding a node to a cluster of nodes in accordance with one embodiment. Specifically, an additional node may be added to the cluster of nodes at a master node at 320 such that the cluster of nodes includes the additional node. The master node may provide (e.g., for each data path to be encrypted and/or decrypted) data path information identifying a data path and information identifying a node (e.g., non-master node) in the cluster that is responsible for encrypting and/or decrypting data for the data path to the additional node at 322. The master node may also provide other cluster members (e.g., non-master nodes) with information identifying the additional node as a member of the cluster at 324.

Figure 4:
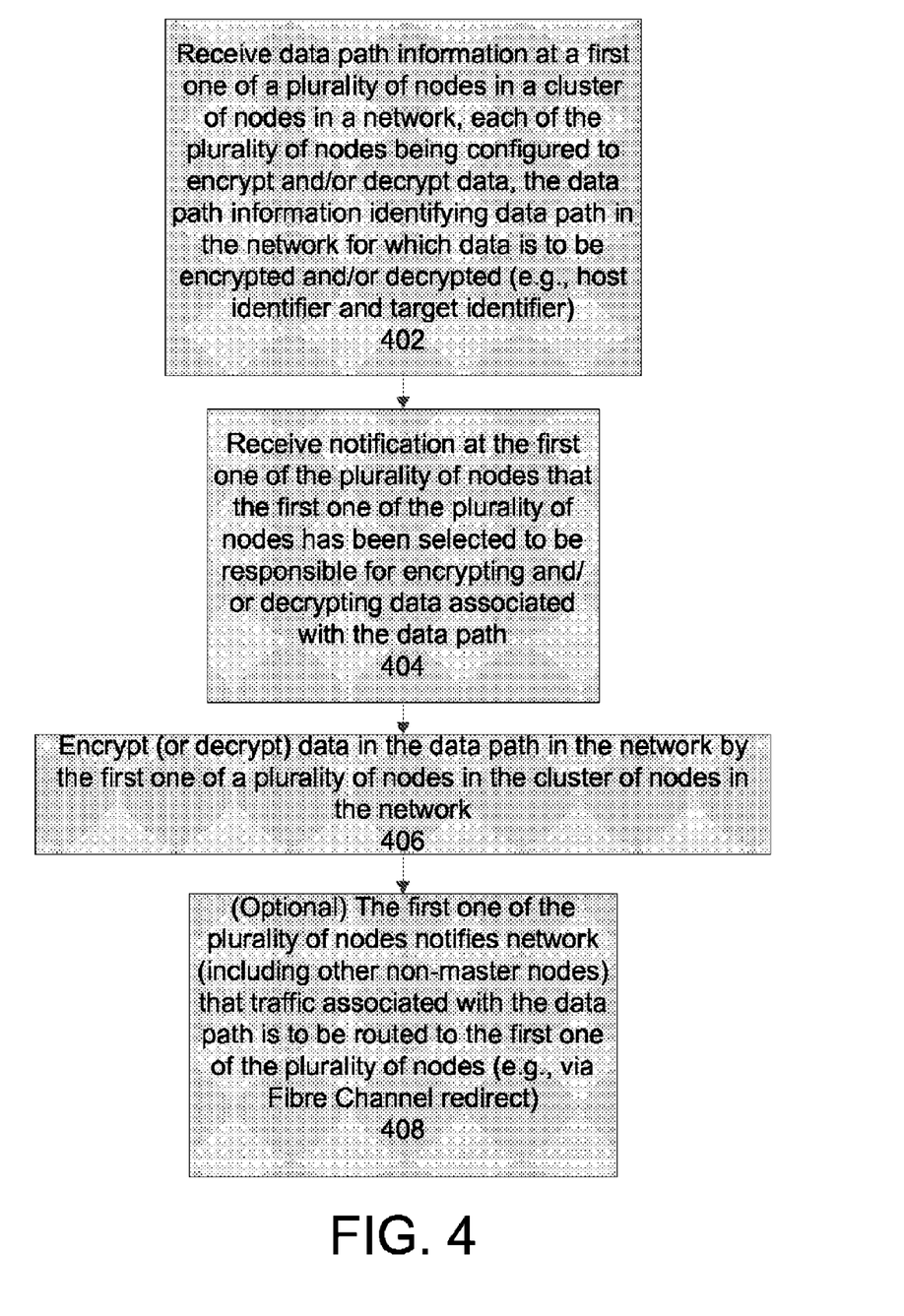
FIG. 4 is a process flow diagram illustrating an example method of operating a non-master node.

Upon being selected by the master node, a selected node may operate to encrypt and/or decrypt data associated with a particular data path, as it has previously been instructed by the master node. FIG. 4 is a process flow diagram illustrating an example method of operating a non-master node in accordance with one embodiment. A first one of a plurality of nodes (e.g., non-master node) in a cluster of nodes may receive data path information identifying a data path in the network for which data is to be encrypted and/or decrypted at 402 from the master node. The data path may be identified by a host identifier, a target identifier, and/or a LUN identifier. The first one of the plurality of nodes may also receive a notification (e.g., from the master node) that the first one of the plurality of nodes has been selected to be responsible for encrypting and/or decrypting data associated with the data path at 404. Upon receiving data associated with the data path, the first one of the plurality of nodes may thereafter encrypt (or decrypt) the data at 406. Specifically, upon receiving a data packet including a header having a source address field including the host identifier and a destination address field including the target identifier, the first one of the plurality of nodes may encrypt a body of the data packet prior to forwarding the encrypted data packet to the target. Similarly, upon receiving a data packet including a header having a source address field including the target identifier and a destination address field including the host identifier, the first one of the plurality of nodes may decrypt a body of the data packet prior to forwarding the decrypted data packet to the host.

In order to ensure that it receives data associated with the data path, the first one of the plurality of nodes may notify the network (e.g., network devices including other non-master nodes) that traffic associated with the data path is to be routed (e.g., redirected) to the first one of the plurality of nodes at 408. For instance, the first one of the plurality of nodes may send a Fibre Channel redirect to network devices in the network indicating that traffic associated with the data path is to be redirected to the first one of the plurality of nodes. Alternatively, the master node may have already sent such a redirect, as set forth above with respect to FIG. 3A.

A node may operate as instructed until a failure occurs. A failure may be detected locally within a network device containing the node, or externally (e.g., by the master node.) Both of these scenarios will be described in further detail below with reference to FIGS. 5A-5B.

Figure 5A:
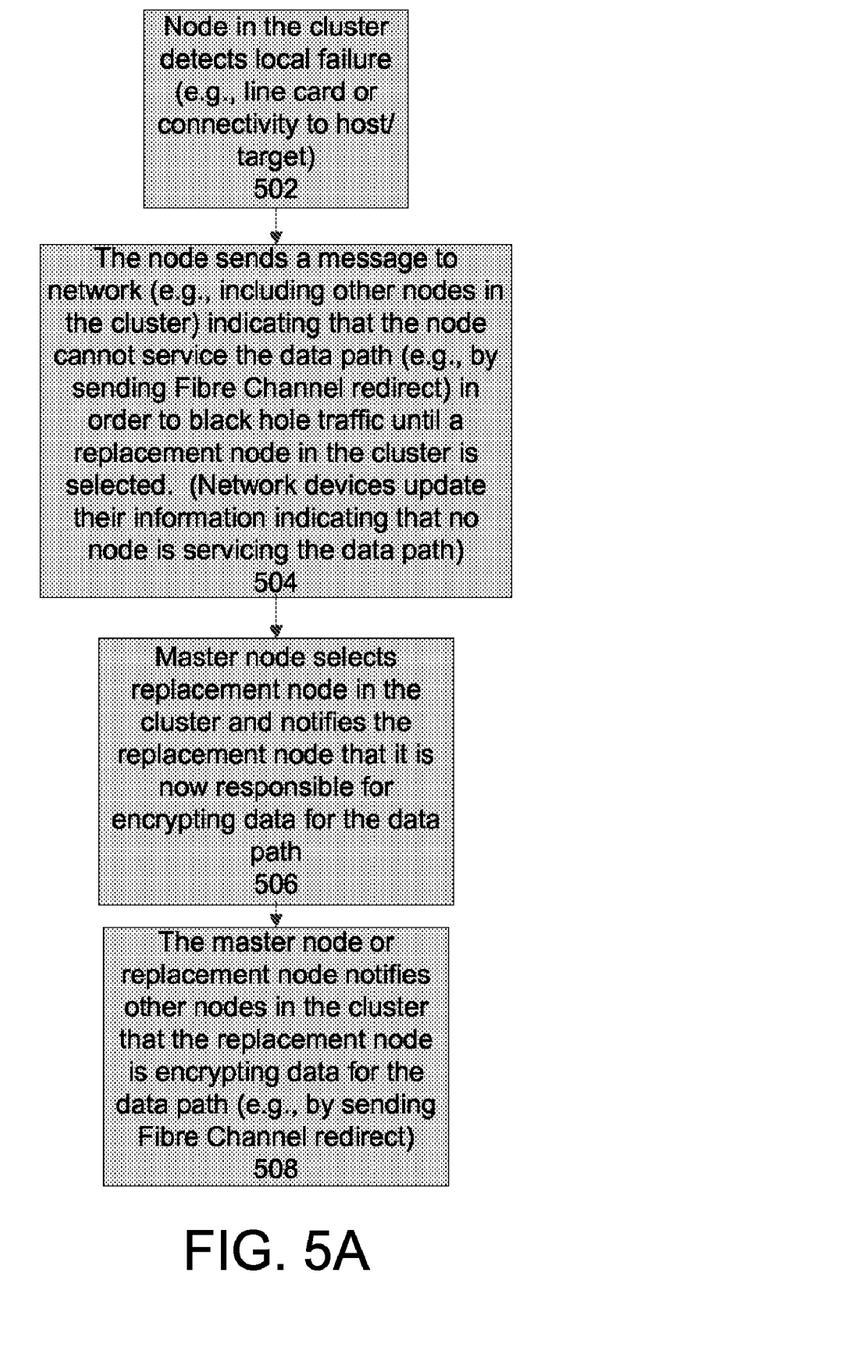
FIG. 5A is a process flow diagram illustrating an example method of replacing a previously selected node in the event of a locally detected failure.

FIG. 5A is a process flow diagram illustrating an example method of replacing a previously selected node in the event of a locally detected failure in accordance with one embodiment. The previously selected node in the cluster may detect a local failure preventing it from encrypting (or decrypting) data associated with the data path. For instance, the node may detect a problem with the line card or with connectivity to either the host or the target at 502. The node may then send a message to network devices in the network (e.g., including the master node and other non-master nodes in the cluster) indicating that the node cannot service the data path. For instance, the node may send a Fibre Channel redirect message in order to redirect the traffic that was previously redirected to the node. Alternatively, the node may send a message to the master node, which may then notify other network devices in the network (e.g., including other non-master nodes in the cluster) of the failure. Thus, this traffic may be "black-holed" until a replacement node in the cluster is selected. The switches may then update their information indicating that no node is servicing the data path at 504. Upon receiving the message indicating that the node cannot service the data path, the master node may select a replacement node in the cluster and notify the replacement node that it is now responsible for encrypting (and/or decrypting) data for the data path at 506. The master node or replacement node may notify other nodes in the cluster that the replacement node is responsible for encrypting (and/or decrypting) data for the data path (e.g., by sending a Fibre Channel redirect) at 508.

Figure 5B:
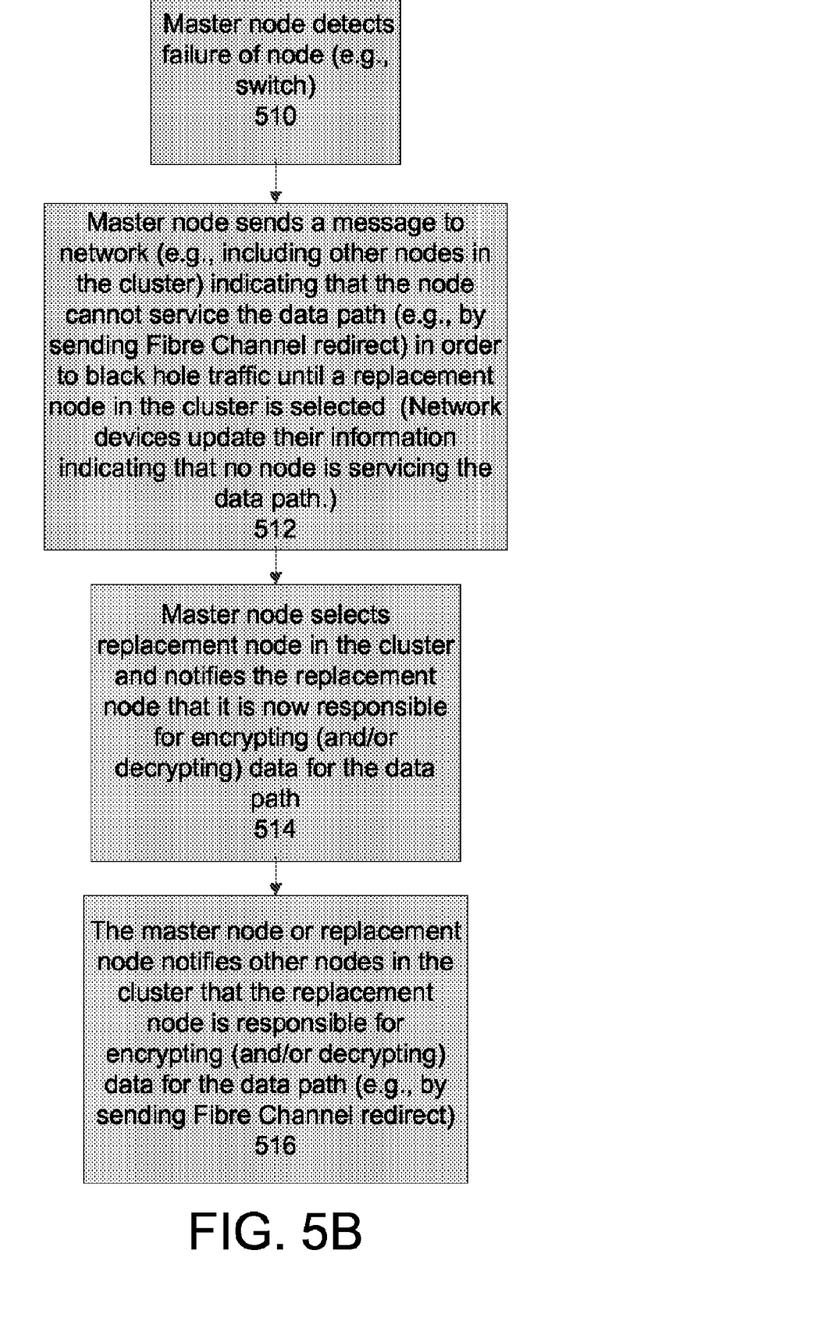
FIG. 5B is a process flow diagram illustrating an example method of replacing a previously selected node in the event of a failover.

In some instances, a failure is detected externally to the node (e.g., by the master node). FIG. 5B is a process flow diagram illustrating an example method of replacing a previously selected node in the event of a failover in accordance with one embodiment. Where a network device including the previously selected node has failed, the node may not be able to send a message indicating that it is not functioning. In these instances, the master node may detect a failure of the node at 510. For instance, the master node may ascertain that a heartbeat is not detected from the network device for a period of time. The master node may send a message to network devices in the network (e.g., including other nodes in the cluster) indicating that the previously selected node cannot service the data path at 512. For example, the master node may send a Fibre Channel redirect message discontinuing the redirecting of traffic associated with the data path to the node. The network devices receiving this message may update their information indicating that no node is servicing the data path. Thus, these network devices may hold traffic associated with the data path until a replacement node in the cluster is selected. The master node may select a replacement node in the cluster and notify the replacement node that it is now responsible for encrypting and/or decrypting data for the data path at 514. The master node or the replacement node may notify network devices in the network (including other nodes in the cluster) that the replacement node is responsible for encrypting and/or decrypting data for the data path (e.g., by sending a Fibre Channel redirect message) at 516. Upon receiving such a redirect message, network devices such as switches in the network may route traffic associated with the data path via the replacement node.

In accordance with various embodiments, if a node that has previously failed becomes available, the node may be re-assigned its previous encryption/decryption responsibilities. For instance, the master node may send a notification (e.g., Fibre Channel redirect) to network devices in the network that rebinds the data path to the node.

As set forth above, a master node may assign a node the responsibility of encrypting and/or decrypting data associated with a particular data path. Such an assignment may be performed during initial configuration (e.g., selection) of a node or replacement of a previously selected node. The master node may apply a variety of algorithms in the selection of a node in both of these instances.

Figure 6:
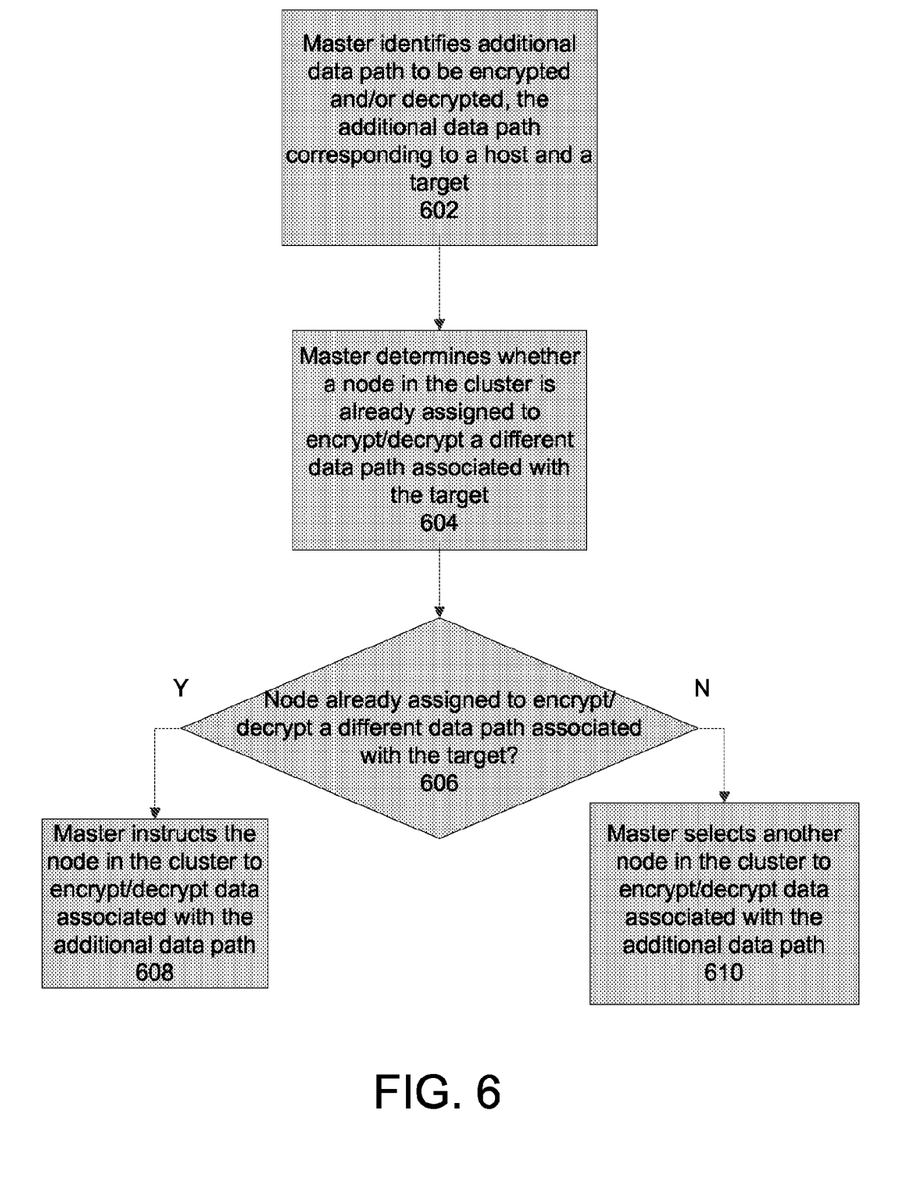
FIG. 6 is a process flow diagram illustrating an example method of selecting a node to be responsible for encrypting and/or decrypting data associated with a data path.

FIG. 6 is a process flow diagram illustrating an example method of selecting a node to be responsible for encrypting and/or decrypting data associated with a data path in accordance with one embodiment. The master node may identify an additional data path to be encrypted and/or decrypted at 602. As set forth above, the additional data path may correspond to a host and/or target. The master may determine whether a node in the cluster is already assigned to encrypt and/or decrypt a different data path associated with the target at 604. If it determined at 606 that a node in the cluster is already assigned to encrypt/decrypt a different data path associated with the target at 606, the mater node may instruct the node to encrypt and/or decrypt data associated with the additional data path at 608. However, if it is determined at 606 that a node in the cluster is not already assigned to encrypt/decrypt a different data path associated with the target, the master node may select a node in the cluster to encrypt and/or decrypt data associated with the additional data path at 610. In this manner, the master may perform load balancing in order to select nodes to perform encryption and/or decryption in association with various data paths.

Generally, the techniques for performing the disclosed embodiments may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention may be implemented on a general-purpose programmable machine selectively activated or reconfigured by a computer program stored in memory. Such programmable machine may be a network device designed to handle network traffic. Such network devices typically have multiple network interfaces. Specific examples of such network devices include routers and switches. A general architecture for some of these machines will appear from the description given below. Further, various embodiments may be at least partially implemented on a card (e.g., an interface card) for a network device or a general-purpose computing device.

Figure 7:
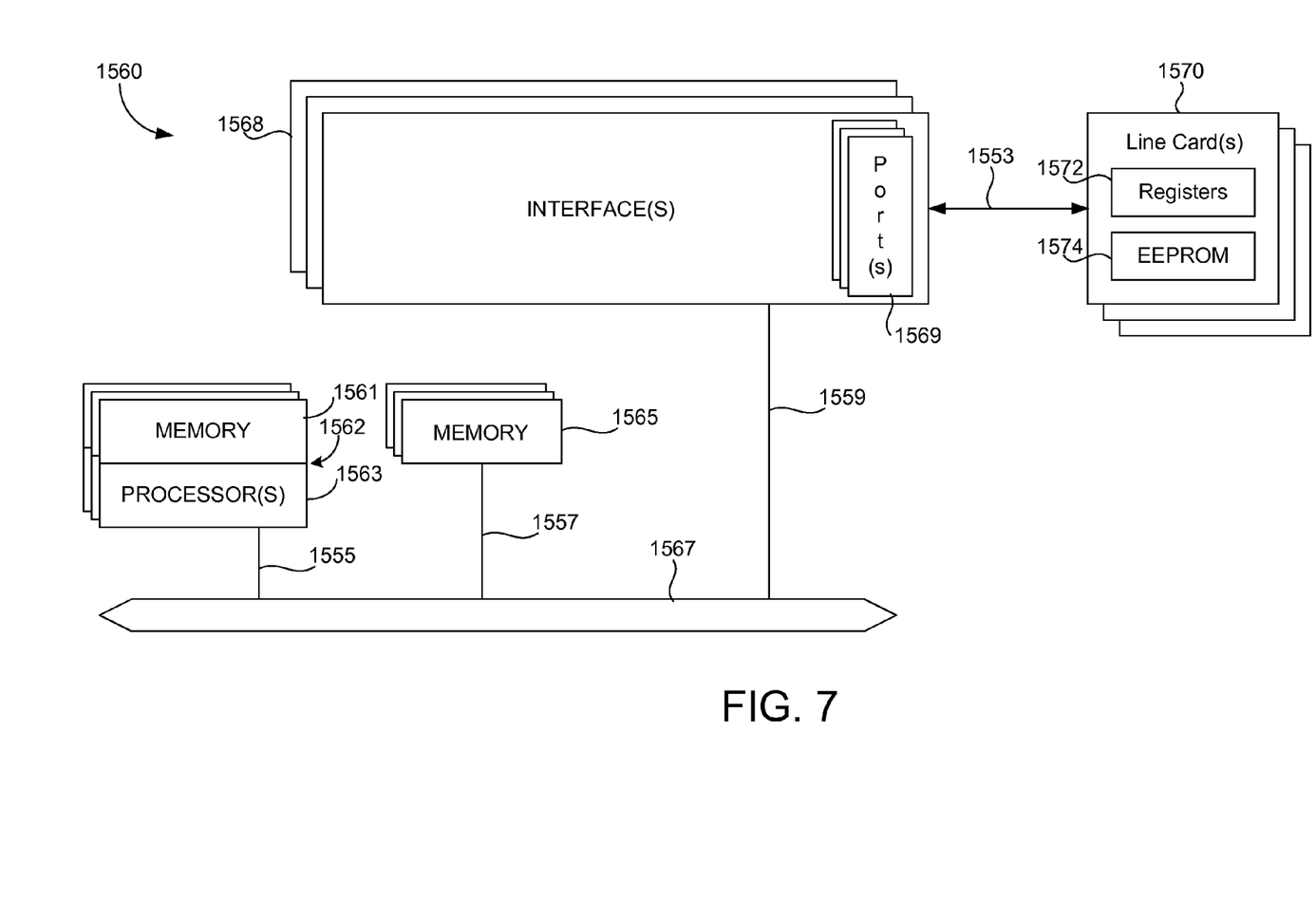
FIG. 7 is a diagrammatic representation of an example network device in which various embodiments may be implemented.

The disclosed embodiments may be implemented at network devices such as switches or routers. Referring now to FIG. 7, a router or switch 710 suitable for implementing embodiments of the invention includes a master central processing unit (CPU) 762, interfaces 768, and a bus 715 (e.g., a PCI bus). When acting under the control of appropriate software or firmware, the CPU 762 is responsible for such router tasks as routing table computations and network management. It may also be responsible for implementing the disclosed embodiments, in whole or in part. The router may accomplish these functions under the control of software including an operating system (e.g., the Storage Area Network Operating System (SAN-OS®) of Cisco Systems, Inc.) and any appropriate applications software. CPU 762 may include one or more processors 763 such as a processor from the Motorola family of microprocessors or the MIPS family of microprocessors. In an alternative embodiment, processor 763 is specially designed hardware for controlling the operations of router 10. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

The interfaces 768 are typically provided as interface cards (sometimes referred to as "line cards"). Generally, they control the sending and receiving of data packets or data segments over the network and sometimes support other peripherals used with the router 710. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, HSSI interfaces, POS interfaces, LAN interfaces, WAN interfaces, metropolitan area network (MAN) interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc. Although the system shown in FIG. 7 is one specific router of the present invention, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 765) configured to store data, program instructions for the general-purpose network operations and/or the inventive techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the embodiments of the invention, and these variations would become clear to those of ordinary skill in the art after perusal of this application. For example, the various examples described herein relate to the encryption of data. However, the disclosed embodiments may also be performed in order to distribute the responsibility for decryption of data. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
providing data path information to one or more of a plurality of nodes in a cluster of nodes in a network, each of nodes in the cluster being configured for encryption of data, wherein the data path information identifies a data path between a host identifier and a target identifier;
selecting one of the nodes to be responsible for encryption of data in the data path; and
notifying the selected one of the nodes of its responsibility for encryption of data associated with the data path, wherein traffic associated with the data path is redirected to the selected one of the nodes.

2. The method as recited in claim 1, wherein the providing, selecting, and notifying steps are performed by a master node.

3. The method as recited in claim 1, further comprising:
instructing network devices in the network that traffic associated with the data path is to be routed via the selected node such that traffic associated with the data path is redirected to the selected one of the nodes.

4. The method as recited in claim 3, wherein the providing, selecting, notifying, and instructing steps are performed by a master node.

5. The method as recited in claim 1, wherein the data path is further identified by a LUN identifier.

6. The method as recited in claim 1, wherein one or more nodes in the cluster of nodes are each implemented in a separate line card.

7. The method as recited in claim 1, wherein one or more nodes in the cluster of nodes are each implemented as a separate network device.

8. The method as recited in claim 1, further comprising:
adding an additional node to the cluster of nodes such that the cluster of nodes includes the additional node;
providing the data path information identifying the data path to the additional node; and
providing information identifying the selected one of the nodes in the cluster that is responsible for encrypting data for the data path to the additional node.

9. The method as recited in claim 8, further comprising:
notifying other nodes that the additional node has been added to the cluster of nodes.

10. The method as recited in claim 1, further comprising:
detecting a failure of the selected one of the nodes;
selecting a replacement one of the nodes; and
notifying the replacement one of the nodes that it is responsible for encrypting data for the data path.

11. The method as recited in claim 10, further comprising:
sending a message to other nodes in the cluster of nodes indicating that the replacement one of the nodes is responsible for encrypting data for the data path.

12. The method as recited in claim 10, further comprising:
instructing network devices in the network that traffic associated with the data path is to be routed via the replacement one of the nodes.

13. The method as recited in claim 10, further comprising:
sending a message to network devices in the network indicating that the selected one of the nodes cannot service the data path.

14. The method as recited in claim 1, further comprising:
determining whether one of the nodes is already responsible for encryption of data in a different data path associated with the target; and
when it is determined that one of the nodes is already responsible for encryption of data in a different data path associated with the target, selecting one of the nodes to be responsible for encryption of data in the data path includes selecting the one of the nodes that is already responsible for encryption of data in the different data path associated with the target.

15. An apparatus, comprising:
a processor; and
a memory, at least one of the processor or the memory being adapted for:
providing data path information to one or more of a plurality of nodes in a cluster of nodes in a network, the data path information identifying a data path between a host identifier and a target identifier, wherein each of nodes in the cluster being configured for encryption of data;
selecting one of the nodes to be responsible for encryption of data in the data path; and
notifying the selected one of the nodes of its responsibility for encryption of data associated with the data path, wherein traffic associated with the data path is redirected to the selected one of the nodes.

16. A method, comprising:
receiving data path information at a first one of a plurality of nodes in a cluster of nodes in a network, each of the plurality of nodes being configured to encrypt data, the data path information identifying a data path in the network for which data is to be encrypted, the data path being between a host and a target;
receiving a notification at the first one of the plurality of nodes that the first one of the plurality of nodes has been selected to be responsible for encrypting data associated with the data path; and
encrypting data in the data path in the network by the first one of a plurality of nodes in the cluster of nodes in the network.

17. The method as recited in claim 16, wherein the data path information and the notification are received from a master node.

18. The method as recited in claim 16, further comprising:
notifying a plurality of network devices in the network that traffic associated with the data path is to be routed to the first one of the plurality of nodes.

19. The method as recited in claim 16, wherein the data path is identified by a host identifier and a target identifier, wherein encrypting comprises:
receiving a data packet including a header having a source address field including the host identifier and a destination address field including the target identifier; and
encrypting a body of the data packet.

20. The method as recited in claim 16, further comprising:
detecting a failure preventing the first one of the plurality of nodes from encrypting data associated with the data path; and
sending a notification indicating that the first one of the plurality of nodes cannot service the data path.

21. The method as recited in claim 16, further comprising:
sending a message to other nodes in the cluster of nodes indicating that the first one of the plurality of nodes is responsible for encrypting data for the data path.

22. An apparatus, comprising:
a processor; and
a memory, at least one of the processor or the memory being adapted for:
receiving data path information at a first one of a plurality of nodes in a cluster of nodes in a network, each of the plurality of nodes being configured to encrypt data, the data path information identifying a data path in the network for which data is to be encrypted, the data path being between a host and a target;
receiving a notification at the first one of the plurality of nodes that the first one of the plurality of nodes has been selected to be responsible for encrypting data associated with the data path; and
encrypting data in the data path in the network by the first one of a plurality of nodes in the cluster of nodes in the network.

23. A method, comprising:
encrypting data in a data path in a network by a first one of a plurality of nodes in a cluster of nodes in the network, each of the plurality of nodes in the cluster of nodes being configured for encryption of data, wherein the data path is identified by a host identifier and a target identifier, wherein the first one of the plurality of nodes is assigned to perform encryption of data in the data path identified by the host identifier and the target identifier;
detecting a failure of the first one of the plurality of nodes; and
automatically replacing the first one of the plurality of nodes with a second one of the plurality of nodes such that the second one of the plurality of nodes is assigned to perform encryption of data in the data path identified by the host identifier and the target identifier.

24. The method as recited in claim 1, wherein each of the plurality of nodes in the cluster of nodes is a switch or router.

* * * * *